(12) United States Patent
Arora et al.

(10) Patent No.: US 10,380,535 B1
(45) Date of Patent: Aug. 13, 2019

(54) CREATING GROUP ORDERS THROUGH GEOFENCING

(71) Applicant: Amazon Technologies, Inc., Seattle, WA (US)

(72) Inventors: Siddharth Arora, Seattle, WA (US); Ruslan Anatolyevich Polyanskiy, Bothell, WA (US); Ashraf Alkarmi, Seattle, WA (US); Neha Gureja, Seattle, WA (US); Gustavo Euduardo Lopez, Seattle, WA (US); Pawan Lata Uppuluri, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 632 days.

(21) Appl. No.: 14/961,451

(22) Filed: Dec. 7, 2015

(51) Int. Cl.
  *G06Q 50/12* (2012.01)
  *G06Q 10/08* (2012.01)
  *G01S 5/02* (2010.01)

(52) U.S. Cl.
  CPC ........ *G06Q 10/0835* (2013.01); *G01S 5/0289* (2013.01); *G06Q 50/12* (2013.01)

(58) Field of Classification Search
  CPC ... G06Q 10/0835; G06Q 50/12; G01S 5/0289
  USPC .......................................................... 705/15
  See application file for complete search history.

(56) References Cited

U.S. PATENT DOCUMENTS

| | | | | |
|---|---|---|---|---|
| 7,953,873 B1 * | 5/2011 | Madurzak | ............. | G06Q 50/12 705/15 |
| 8,355,955 B1 * | 1/2013 | Mirchandani | .......... | G06Q 30/02 705/26.1 |
| 9,269,103 B1 * | 2/2016 | Kumar | ............... | G06Q 30/0605 |
| 2002/0055878 A1 * | 5/2002 | Burton | ................... | G06Q 30/06 705/27.2 |
| 2003/0078793 A1 * | 4/2003 | Toth | ....................... | G06Q 30/02 705/15 |
| 2004/0148228 A1 * | 7/2004 | Kwei | ..................... | G06Q 30/06 705/26.4 |
| 2005/0096997 A1 * | 5/2005 | Jain | ........................ | G06Q 30/02 705/26.1 |
| 2005/0177427 A1 * | 8/2005 | Mount | ................... | G06Q 30/00 705/14.38 |
| 2005/0216300 A1 * | 9/2005 | Appelman | ............ | G06Q 10/10 705/319 |
| 2006/0053061 A1 * | 3/2006 | Evans | ................... | G06Q 30/06 705/15 |
| 2006/0178943 A1 * | 8/2006 | Rollinson | .......... | G06Q 30/0601 705/26.1 |
| 2006/0206390 A1 * | 9/2006 | Asano | .................... | G06Q 20/00 705/26.1 |
| 2007/0088624 A1 * | 4/2007 | Vaughn | .................. | G06Q 30/02 705/15 |

(Continued)

OTHER PUBLICATIONS

U.S. Appl. No. 14/961,246, filed Dec. 7, 2015, Non-Final Office Action dated Jul. 11, 2018.

*Primary Examiner* — Ashford S Hayes
(74) *Attorney, Agent, or Firm* — Thomas Horstemeyer, LLP

(57) ABSTRACT

Disclosed are various embodiments for an order management service. Orders may be correlated with an existing order to create a group order. The group order may include items picked up or delivered to the same or geographically proximate locations. Incentives may be used to incite participation in a group order, thereby saving on overall delivery costs.

20 Claims, 8 Drawing Sheets

(56) References Cited

U.S. PATENT DOCUMENTS

| | | | |
|---|---|---|---|
| 2007/0203801 A1* | 8/2007 | Istfan | G06Q 10/10 705/26.1 |
| 2008/0172460 A1* | 7/2008 | Anderson | G06Q 10/10 709/204 |
| 2008/0294607 A1* | 11/2008 | Partovi | G06Q 30/00 |
| 2009/0031232 A1* | 1/2009 | Brezina | H04M 15/00 715/764 |
| 2009/0119168 A1* | 5/2009 | Otto | G06Q 10/087 705/14.26 |
| 2009/0167553 A1* | 7/2009 | Hong | G06Q 10/02 340/4.61 |
| 2009/0216646 A1* | 8/2009 | Seven | G06Q 30/02 705/14.17 |
| 2009/0259718 A1* | 10/2009 | O'Sullivan | G06Q 10/10 709/204 |
| 2009/0288012 A1* | 11/2009 | Hertel | G06Q 20/02 715/738 |
| 2009/0319314 A1* | 12/2009 | Good | G06Q 20/10 705/329 |
| 2010/0125490 A1* | 5/2010 | Kiciman | G06Q 30/02 705/14.1 |
| 2010/0161432 A1* | 6/2010 | Kumanov | G06Q 20/102 705/15 |
| 2010/0169161 A1* | 7/2010 | Sacco | G06Q 10/107 705/319 |
| 2010/0312649 A1* | 12/2010 | Lurie | G06Q 30/02 705/14.66 |
| 2010/0324996 A1* | 12/2010 | Kim | G06Q 30/02 705/14.66 |
| 2011/0029363 A1* | 2/2011 | Gillenson | G06Q 30/02 705/14.15 |
| 2011/0040655 A1* | 2/2011 | Hendrickson | G06Q 30/02 705/27.1 |
| 2011/0106664 A1* | 5/2011 | Landau | G06Q 10/02 705/27.1 |
| 2011/0125550 A1* | 5/2011 | Erhart | G06Q 30/0201 705/7.29 |
| 2011/0125566 A1* | 5/2011 | McLaughlin | G06Q 20/20 705/14.23 |
| 2011/0246287 A1* | 10/2011 | Wright | G06Q 10/00 705/14.45 |
| 2011/0258058 A1* | 10/2011 | Carroll | G06Q 30/06 705/15 |
| 2011/0270662 A1* | 11/2011 | Rocco | G06Q 30/02 705/14.27 |
| 2011/0282734 A1* | 11/2011 | Zurada | G06Q 30/02 705/14.49 |
| 2011/0289433 A1* | 11/2011 | Whalin | G06Q 10/10 715/753 |
| 2011/0313897 A1* | 12/2011 | Mulakaluri | G06Q 20/10 705/30 |
| 2011/0320250 A1* | 12/2011 | Gemmell | G06Q 30/02 705/14.16 |
| 2012/0036028 A1* | 2/2012 | Webb | G06Q 30/06 705/15 |
| 2012/0054002 A1* | 3/2012 | Rotbard | G06Q 20/20 705/14.3 |
| 2012/0072855 A1* | 3/2012 | Baldwin | G06Q 10/10 715/752 |
| 2012/0116915 A1* | 5/2012 | Zheng | G06Q 30/02 705/26.7 |
| 2012/0143753 A1* | 6/2012 | Gonzalez | G06Q 20/12 705/41 |
| 2012/0191522 A1* | 7/2012 | McLaughlin | G06Q 50/01 705/14.23 |
| 2012/0203619 A1* | 8/2012 | Lutnick | G06Q 30/02 705/14.35 |
| 2012/0226614 A1* | 9/2012 | Gura | G06O 20/12 705/44 |
| 2012/0232974 A1* | 9/2012 | Castiglione | G06Q 30/0215 705/14.21 |
| 2012/0239494 A1* | 9/2012 | Hu | G06Q 30/0207 705/14.49 |
| 2012/0239683 A1* | 9/2012 | Starkman | G06F 16/9535 707/769 |
| 2012/0246004 A1* | 9/2012 | Book | G06Q 30/02 705/14.58 |
| 2012/0278064 A1* | 11/2012 | Leary | G06F 17/274 704/9 |
| 2012/0303425 A1* | 11/2012 | Katzin | G06Q 20/027 705/14.4 |
| 2012/0310747 A1* | 12/2012 | Calabria | G06Q 10/10 705/14.67 |
| 2013/0006733 A1* | 1/2013 | Fisher | G06Q 30/02 705/14.12 |
| 2013/0046610 A1* | 2/2013 | Abraham | G06Q 30/00 705/14.35 |
| 2013/0110641 A1* | 5/2013 | Ormont | G06Q 30/0251 705/14.66 |
| 2013/0124314 A1* | 5/2013 | Navar | G06Q 30/0251 705/14.53 |
| 2013/0151357 A1* | 6/2013 | Havas | G06Q 50/12 705/15 |
| 2013/0179268 A1* | 7/2013 | Hu | G06Q 30/0207 705/14.66 |
| 2013/0226651 A1* | 8/2013 | Napper | G06Q 10/08 705/7.26 |
| 2013/0332527 A1* | 12/2013 | Du | G06Q 10/10 709/204 |
| 2014/0074743 A1* | 3/2014 | Rademaker | G06Q 50/28 705/334 |
| 2014/0214465 A1* | 7/2014 | L'Heureux | G06Q 50/12 705/7.13 |
| 2015/0170099 A1* | 6/2015 | Beach-Drummond | G06Q 10/08355 705/26.81 |
| 2015/0262121 A1* | 9/2015 | Riel-Dalpe | G06Q 10/08 705/15 |
| 2015/0371318 A1 | 12/2015 | Hen et al. | |
| 2016/0034845 A1* | 2/2016 | Hiyama | G06Q 10/063114 705/7.15 |
| 2016/0086269 A1 | 3/2016 | Baker | |
| 2016/0364678 A1* | 12/2016 | Cao | G06Q 50/30 |
| 2017/0138749 A1* | 5/2017 | Pan | G01C 21/3438 |

* cited by examiner

CREATING GROUP ORDERS THROUGH GEOFENCING

BACKGROUND

A third party service can facilitate the placement of orders for delivery from a provider. For example, the third party service may allow users to place orders with various restaurants for delivery. In some circumstances, a group of customers may wish to place orders together, such as when a group of customers wishes to eat together. These orders may be placed with the same or different restaurants through the third party service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A third party service can allow customers to place orders for delivery through various fulfillment providers of goods. For example, a third party service can allow customers to place orders for food deliveries with restaurants associated with the third party service. The third party service may also employ their own drivers to pick up the orders for delivery to the customer. This allows for fulfillment providers to offer deliveries to customers without employing their own dedicated drivers, and provides many delivery options for customers through a single account of the third party service.

In some circumstances, a group of individuals may wish to order goods for delivery through the third party service. For example, a group may wish to eat food delivered by the third party service, which may result in problems. If each customer places their own individual order, there is no assurance that the orders will arrive together or within a certain time frame. This may result in a certain customer's food getting cold before the remainder of the ordered food is delivered. If a single customer places the order for the group, this may place the burden of payment on a single customer. This may also result in the single customer knowing the entirety of each other customer's order, raising privacy concerns.

Additionally, the third party service may receive separate orders for customers whose delivery locations are nearby, or orders to be picked up from the same or nearby fulfillment providers. If these orders are processed individually, the delivery routes may not be optimized to take advantage of the proximity of the delivery locations or the fulfillment providers. This may result in increased costs to deliver the goods.

An order management service operates as a third party service to accept orders from users. The order management service can group individual orders into a group order for delivery on a single delivery route. This can include providing a unique identifier used in association with individual orders in order to group them into a group order. This can also include, after receiving a first order, opening enrollment to a group order by other users near the delivery location of the first order, or ordering from fulfillment providers near the fulfillment provider of the first order. This can be facilitated by communicating notifications to clients geographically proximate to the delivery location of the first order, by modifying user interfaces of geographically proximate clients to allow them to add to a group order, or by another approach.

In the following discussion, a general description of the system and its components is provided, followed by a discussion of the operation of the same.

Figure 1:
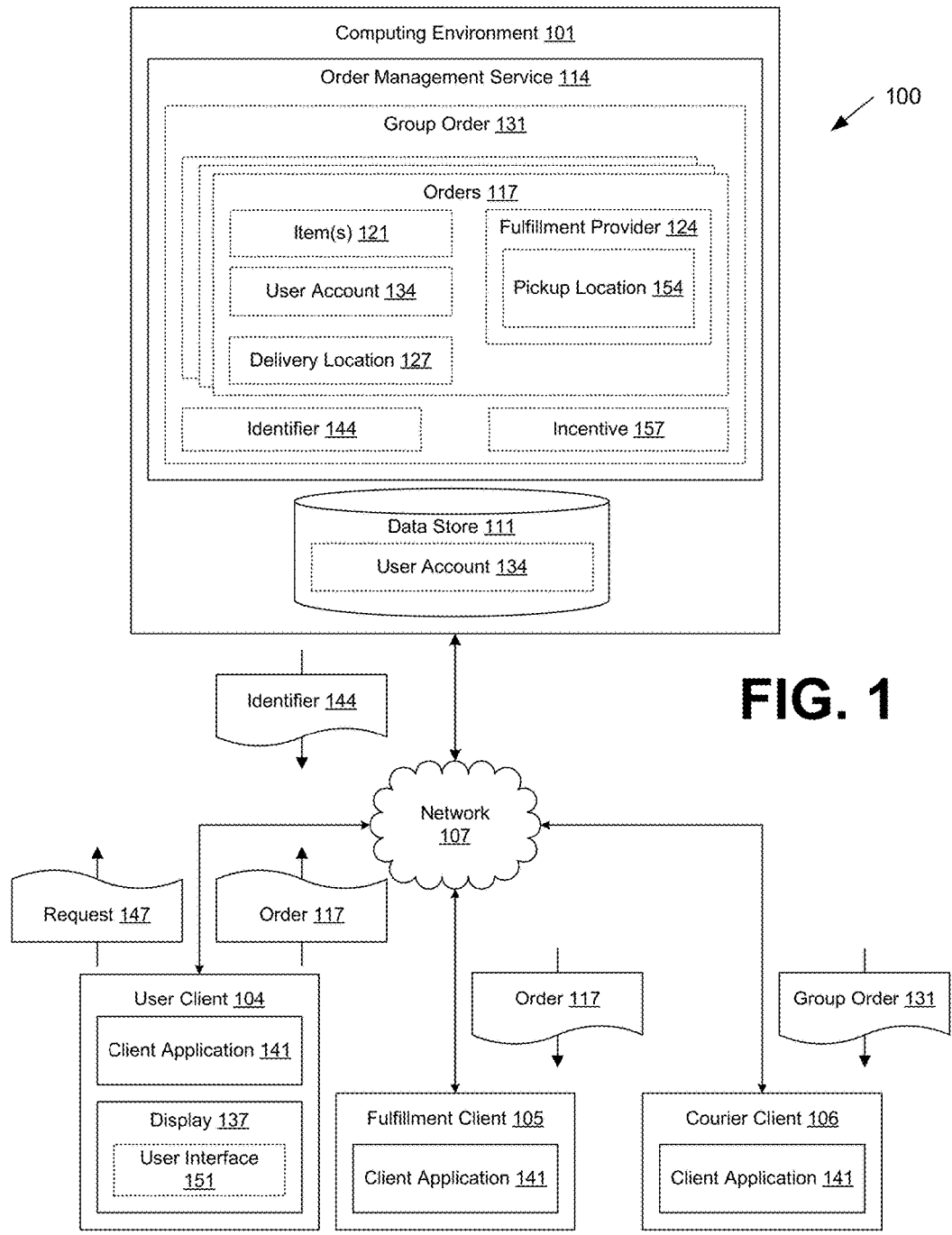
FIG. 1 is a drawing of a networked environment according to various embodiments of the present disclosure.

With reference to FIG. 1, shown is a networked environment 100 according to various embodiments. The networked environment 100 includes a computing environment 101, a user client 104, a fulfillment client 105 and a courier client 106, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 101 may comprise, for example, a server computer or any other system providing computing capability. Alternatively, the computing environment 101 may employ a plurality of computing devices that may be arranged, for example, in one or more server banks or computer banks or other arrangements. Such computing devices may be located in a single installation or may be distributed among many different geographical locations. For example, the computing environment 101 may include a plurality of computing devices that together may comprise a hosted computing resource, a grid computing resource and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 101 may be representative of a plurality of data stores 111 as can be appreciated. The data stored in the data store 111, for example, is associated with the operation of the various applications and/or functional entities described below.

The components executed on the computing environment 101, for example, include an order management service 114, and other applications, services, processes, systems, engines, or functionality not discussed in detail herein. The order management service 114 is executed to obtain orders 117 for items 121 to be picked up from a fulfillment provider 124 for delivery to a delivery location 127. In some embodiments, the items 121 are associated with or subject to a preparation time after the placement of an order 117 in order to be eligible for pickup. For example, food items 121 may be subject to cooking or packaging time. As another example, packaged items 121 may be subject to wrapping or other alterations. To this end, the order management service 114 can forward orders 117 to fulfillment clients 105 for processing by a fulfillment provider 124. Additionally, the order management service 114 groups individual orders 117 into group orders 131 for pickup and delivery by a delivery provider.

The data stored in the data store 111 includes, for example, user accounts 134, and potentially other data. User accounts 134 comprise data associated with one or more customers of the order management service 114. User accounts 134 may comprise, for example, login information such as usernames or passwords to authenticate a customer attempting to access the order management service 114. The user accounts 134 may also comprise contact information such as a mailing address, email address, phone number or other contact information. Additionally, the user accounts 134 may comprise data representing payment instruments used to consummate an order with the order 117 management service 114, including credit cards, debit cards, banking accounts, prepaid accounts, or other payment instruments. User accounts 134 may also comprise user preferences embodying settings, configurations, or other preferences used in interactions with the order management service 114 as will be described below The user client 104, fulfillment client 105 and courier client 106 are representative of a plurality of client devices that may be coupled to the network 107. The user client 104, fulfillment client 105 and courier client 106 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The user client 104 may include a display 137. The display 137 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The user client 104, fulfillment client 105 and courier client 106 may each be configured to execute various applications such as a client application 141 and/or other applications. The client application 141 may be executed in a respective user client 104, fulfillment client 105 and courier client 106, for example, to access network content served up by the computing environment 101 and/or other servers. To this end, the client application 141 may comprise, for example, a browser, a dedicated application, etc. The user client 104, fulfillment client 105 and courier client 106 may each be configured to execute applications beyond the client application 141 such as, for example, email applications, social networking applications, word processors, spreadsheets, and/or other applications.

Next, a general description of the operation of the various components of the networked environment 100 is provided. To begin, a user client 104 submits an order 117 to the order management service 114 for fulfillment by a fulfillment provider 124. The order 117 indicates one or more items 121 provided by a fulfillment provider 124 to be delivered to a user associated with the user client 104. The order 117 may also indicate a delivery location 127 to where the items 121 are to be delivered. Submitting the order 117 may include, for example, selecting a fulfillment provider 124 from a listing of eligible fulfillment providers 124 communicated by the order management service 114 to the user client 104. Fulfillment providers 124 are providers of items 121 indicated in an order 117. Accordingly, fulfillment providers 124 may include restaurants, merchants, or other providers of goods or services. Eligible fulfillment providers 124 may be determined according to a proximity to a delivery location 127 for the user client 104, a geographic location of the user client 104, available capacity to handle orders 117 by the fulfillment provider 124, or other criteria.

Receiving the order 117 may open eligibility to create or add to a group order 131 including the submitted order 117. Although the following discussion relates to a group order 131 opened in response to a first order 117 submitted by a user client 104, it is understood that in some embodiments the order management service 114 may automatically generate a placeholder or stub order 117 to open a group order 131 opportunity. To create a group order 131 including the submitted order 117, the order management service 114 determines which other orders 117 should be added to a group order 131 included the submitted order 117. In some embodiments, after receiving the submitted order 117, the order management service 114 communicates an identifier 144 corresponding to a group order 131 to the user client 104 from which the submitted order 117 was received. In some embodiments, the identifier 144 may be randomly generated identifier 144, an identifier 144 comprising a hash value or string, or other identifier 144 generated by the order management service 114. In other embodiments, the identifier 144 may include a value identified by or obtained from the user client 104. The identifier 144 may also include other values.

Communicating the identifier 144 to the user client 104 may include encoding the identifier 144 in a network page or other content rendered by the user client 104. In other embodiments, the identifier 144 may be communicated in a notification such as a push notification, in an email or Short Message Service (SMS) message, or communicated by another approach.

The user client 104 may then communicate the identifier 144 to other user clients 104. This may be performed by including the identifier 144 in an SMS message, email, or other message communicated to another user client 104. This may also include sharing the identifier 144 on a social networking or social media platform. The identifier may also be encoded as a message or other data for rendering by a client application 141 facilitating access to the order management service 114 and the creation of orders 117, such as a dedicated application. In other embodiments, the order management service 114 may communicate the identifier 144 to the other clients by a similar approach. The other clients 144 may then submit orders 117 to the order management service 114 with a request 147 including the identifier 144. The request 147 serves as an indication that the order 117 should be added to the group order 131 corresponding to the identifier 144.

In other embodiments, the order management service 114 may add orders 117 to the group order 117 for a submitted order 117 by determining user clients 104 geographically proximate to the user client 104 corresponding to the submitted order 117 or graphically proximate to a delivery location 127 of the submitted order 117. A user client 104 may be considered geographically proximate if it is within a predefined distance of a given point, such as a location of another user client 104 or location, within a predefined geographic boundary, within a set of boundaries, also known as a geofence, or satisfying other criteria. In embodiments in which a geofence is implemented, the geofence may be predefined, or relative to one or more given points.

The order management service 114 may then communicate a notification to the geographically proximate user clients 104 indicating an opportunity to join a group order 131. The notification may further include a link or other navigation aid facilitating an entry of the user client 104 to an ordering pipeline to complete an order 117 with an eligible fulfillment provider 124.

In other embodiments, a user client 104 may access the order management service 114 to submit an order 117. The order management service 114 may modify a user interface 151 of a geographically proximate user client 104 accessing the order management service 114 to indicate an opportunity to join a group order 131. For example, the order management service 114 may include a button, menu element, or other user interface 151 element that, when selected, indicates that a subsequently placed order 117 should be added to the available group order 131. Thus, non-geographically proximate user clients 104 would receive a user interface 151 excluding the additional user interface element 151.

In some embodiments, the user interface 151 element may implement a "one-click" or automatic generation of an order 117 for addition to the group order 131. For example, a selection or interaction with the user interface 151 element may automatically generate an order 117 having the same items 121 as a first order 117 of a group order 131 for delivery to a requesting user. Such an order 121 may include a same quantity of items 121, or a scaled quantity of items 121 relative to the requesting user.

The order management service 114 may enforce terms for adding orders 117 to a group order 131. For example, the order management service 114 may restrict the addition of orders 117 to being within a predefined time window. The time window may be set relative to the submission of a first order 117, relative to a pickup time of one or more orders 117 by a courier, relative to another time or event, or defined independent of other values. The order management service 114 may also enforce thresholds that must be satisfied by a valid group order 131. For example, the threshold may define a minimum number of orders 117, participants, or items 121, or a minimum cost threshold to qualify for a group order 131.

In embodiments in which a threshold is not satisfied, the order management service 114 may cancel the pending invalid group order 131, and process included orders 117 individually. The order management service 114 may also communicate a notification to user clients 104 of one or more participants indicating the failure of the group order 131. The notification may also solicit a selection to cancel an individual order 117, or to proceed with an individual order 117 outside of a group order 131.

After receiving the orders 117 to be included in the group order 131, the order management system 114 communicates the orders 117 to fulfillment clients 105 of the respective fulfillment providers 124 indicated in the orders 117. In some embodiments, the order management service 114 may determine a timing for when the orders 117 should be communicated to the fulfillment clients 105. For example, an order 117 may be communicated to a fulfillment client 105 based on estimated travel time between a courier's current or projected location and a pickup location 154 of the corresponding fulfillment provider 124. This may take into account an average, estimated, or otherwise determined preparation time for a given order 117. For example, the order management service 114 may calculate an estimated or average preparation time based on previously recorded preparation times. The order management system 114 may then communicate the order 117 to the fulfillment provider 124 to minimize a time between an arrival by a courier at the pickup location and completing the preparation of the order 117. In other embodiments, the order management service 114 may communicate the orders 117 to the fulfillment provider 124 with an estimated pickup time based on projected travel times for the courier to pick up or deliver orders 117 in the group order 131. The order management service 114 can also determine the timing by another approach.

The order management service 114 can also apply an incentive 157 to a user account 134 of one or more participants in the group order 131. This may include applying a discount to a cost of an order 117, offering a discount to a future order 117, waiving or modifying an order minimum, discounting or waiving a delivery fee, or otherwise providing a benefit to the participants. In embodiments in which a discount, rebate, or credit incentive 157 is applied, the incentive 157 may be based on projected savings on delivery costs, or other criteria.

The order management service 114 can also communicate an indication of the group order 131 to a courier client 106 associated with a courier or delivery person assigned to the group order 131. The courier may include an employee associated with the order management service 114, a third-party contracted to perform courier services in association with the order management service 114, a courier selected by a crowdsourcing service, or another courier. To this end, the order management service 114 can also determine a delivery route for the group order 141. The delivery route may include a route between all pickup locations 154 and delivery locations 127 of a group order 131, or between a subset of the pickup locations 154 and delivery locations 127. The delivery route may be determined to minimize a total travel time, minimize a total travel distance, minimize a time between one or more pick ups or deliveries, or other criteria.

The order management service 114 may also enforce various restrictions on which fulfillment providers 124 may be included in a group order 131. For example, after submission of a first order 117 open to participation in a group order 131, the order management service 114 may restrict additional orders 117 in the group order 131 to being from the same fulfillment provider 124. As another example, the order management service 114 may restrict additional orders 117 in the group order 131 to being from fulfillment providers 124 having a pickup location 154 within a predefined distance or boundary relative to the pickup location 154 of the fulfillment provider 124 of the first order 117, or within a geofence relative to the pickup location 154 of the fulfillment provider 124 of the first order 117. Fulfillment providers 124 may also be restricted by another approach.

Additionally, the order management service 114 may enforce various restrictions on which delivery locations 127 may participate in a group order 131. For example, after submission of a first order 117 open to participation in a group order 131, the order management service 114 may restrict additional orders 117 in the group order 131 having the same delivery location 127 as the first order 117. As another example, the order management service 114 may restrict additional orders 117 in the group order 131 having delivery locations 127 a predefined distance or boundary relative to the delivery location 127 of the fulfillment provider 124 of the first order 117.

User preferences of a user account 134 may also be used to restrict participation in a group order 131. For example, user account 134 preferences may indicate that notifications or other solicitations to participate in group orders 131 should not be communicated to corresponding user clients 104. As another example, user preferences 134 may limit notifications or other solicitations to participate in group orders 131 communicated to corresponding user clients 104 to those group orders 131 associated with a particular fulfillment provider 124, delivery location 127, user account 134, or other attribute. Participation in group orders 131 may also be restricted by other approaches.

To limit potential overburdening of participants in a group order 131, the order management service 131 may enforce capacity controls. The capacity controls may restrict, for example, a number of items 121 or orders 117 in a group order 131, a number of pending items 121 or orders 117 for a fulfillment provider 124, or a number of items 121 or orders 117 assigned to a particular courier. The order management service 114 may also enable or disable the creation of group orders 131 in response to a capacity of a fulfillment provider 124, courier, or other entity falling above or below a predefined threshold, or satisfying other criteria. Group orders 131 may also be restricted by other approaches.

In further embodiments, the order management service 114 may be configured to receive a request 147 from a user client 104 in anticipation of a group order 131 opportunity. For example, the request 147 may indicate that an order 117 should be created with a given fulfillment provider 124 upon opening of a group order 131 opportunity for which the fulfillment provider 124 is eligible to participate.

Additionally, in some embodiments, the order management service 114 may be configured to automatically correlate orders 117 into group orders 131 without explicit requests 147 from a user client 104. For example, the order management service 114 may correlate into a group order 131 those orders 117 from a same or geographically proximate fulfillment providers 124, or delivered to same or geographically proximate delivery locations. In such an embodiment, the order management service 114 may automatically implement a time window into which orders 117 must be place for inclusion in a group order 131. Such a time window may be implemented similarly as was discussed above.

Figure 2:
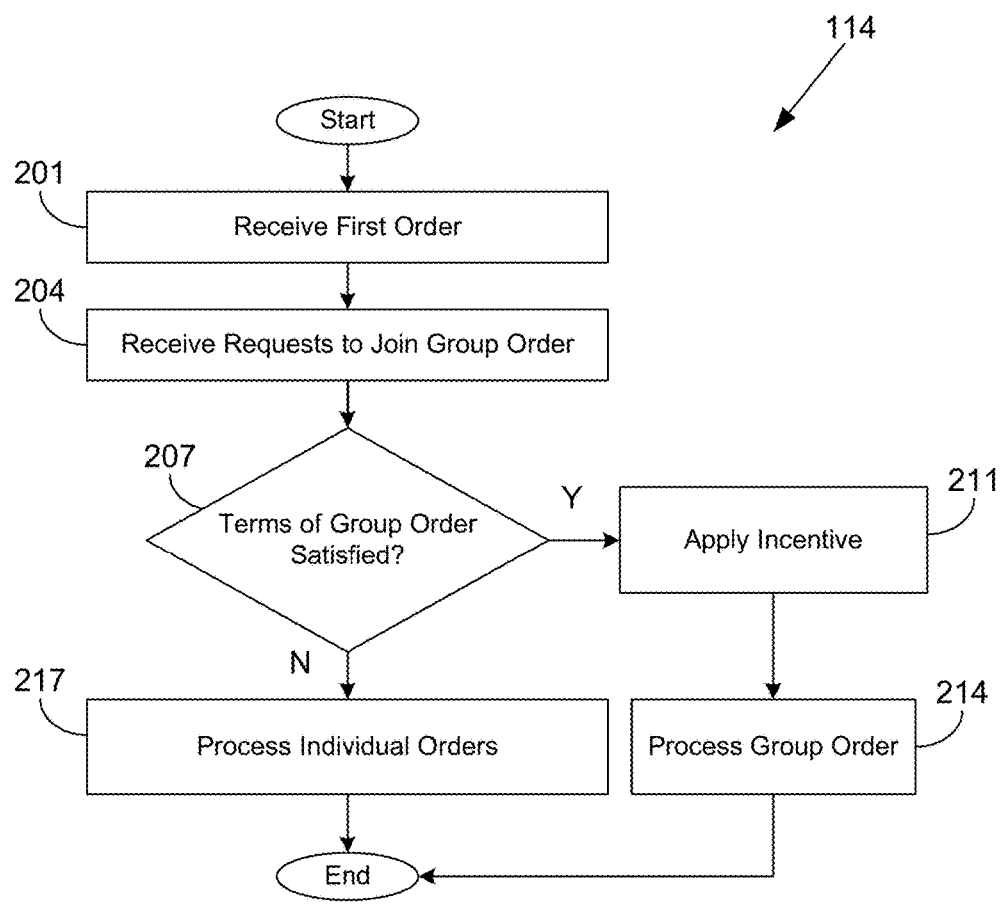
FIGS. 2-4 are flowcharts illustrating examples of functionality implemented as portions of an order management service executed in a computing environment in the networked environment of FIG. 1 according to various embodiments of the present disclosure.

Referring next to FIG. 2, shown is a flowchart that provides one example of the operation of a portion of the order management service 114 according to various embodiments. It is understood that the flowchart of FIG. 2 provides merely an example of the many different types of functional arrangements that may be employed to implement the operation of the portion of the order management service 114 as described herein. As an alternative, the flowchart of FIG. 2 may be viewed as depicting an example of elements of a method implemented in the computing environment 101 (FIG. 1) according to one or more embodiments.

Beginning with box 201, the order management service 114 receives a first order 117 (FIG. 1) from a user client 104 (FIG. 1). Receiving the first order 117 allows subsequently received orders 117 to be added to a group order 131 (FIG. 1) including the first order 117. Accordingly, in box 204, the order management application 114 receives requests 147 to add additional orders 117 to a group order 131 including the first order 117, approaches for which will be described in further detail in the discussions of FIGS. 3 and 4.

The order management application 114 then determines, in box 207, whether terms are satisfied in order to initiate a group order 131. In some embodiments, this determination is made after a passage of a predefined time window after submission of the first order 117, or after another deadline. Terms to be satisfied for the group order 131 may include, for example, a minimum number of participants, orders 117, items 121 (FIG. 1), or total cost for the group order 131. Other criteria may also be tied to determining a satisfactory group order 131.

If the terms of the group order 131 are satisfied, the process advances to box 211 where the order management application 114 applies an incentive 157 (FIG. 1) to one or more user accounts 134 (FIG. 1) associated with the group order 131. This may include, for example, applying a discount to one or more orders 117 in the group order 131, applying a credit to the user account 134 for a future purchase, waiving an order minimum for a fulfillment provider 124 (FIG. 1), or applying another incentive 157.

After applying the incentive 157 the process advances to box 214 where the order management application 114 processes the orders 117 in the group order 131. This may include processing one or more payment instruments of user accounts 134. This may also include communicating the orders 117 to the respective fulfillment providers 124. In some embodiments, the order management service 114 may determine a timing for when the orders 117 should be communicated to the fulfillment clients 105 (FIG. 1) of the fulfillment providers 124. For example, an order 117 may be communicated to a fulfillment client 105 based on estimated travel time between a courier's current or projected location and a pickup location 154 (FIG. 1) of the corresponding fulfillment provider 124. This may take into account an average, estimated, or otherwise determined preparation time for a given order 117. For example, the order management service 114 may calculate an estimated or average preparation time based on previously recorded preparation times. The order management system 114 may then communicate the order 117 to the fulfillment provider 124 to minimize a time between an arrival by a courier at the pickup location and completing the preparation of the order 117. In other embodiments, the order management service 114 may communicate the orders 117 to the fulfillment provider 124 with an estimated pickup time based on projected travel times for the courier to pick up or deliver orders 117 in the group order 131. The order management service 114 can also determine the timing by another approach.

Processing the orders 117 of the group order 131 may also include determining a delivery route for the group order 141. The delivery route may be determined to minimize a total travel time, minimize a total travel distance, minimize a time between one or more pick ups or deliveries, or other criteria. An indication of the delivery route may then be communicated to a courier client 106 (FIG. 1). After processing the orders 117 of the group order 131, the process ends.

Returning to box 207, if the terms of the group order 131 are not satisfied, the process moves to box 217 where the order management application 114 processes the orders 117 requested to be added to a group order 131 as individual orders 117. As described above, this may include processing payment instruments of user accounts 134, and communicating the orders 117 to fulfillment clients 105 of respective fulfillment clients 105.

In some embodiments, this may include determining that an order 117 requested to be added to a group order 131 cannot be completed as an individual order 117 outside of a group order 131. For example, an order 117 may fall below a minimum price or number of items 121 enforced by a fulfillment provider 124. When grouped with other orders 117 to the fulfillment provider 124, these minimums may be waived as an incentive 157. However, as an individual order 117, it is invalid. In some embodiments, the order management system 114 may communicate a notification to a user client 104 associated with an invalid order 117 requesting that the order 117 be modified to satisfy the requirements of the fulfillment provider 124. In other embodiments, the order management system 114 may cancel the invalid order 117, or take another action. After processing the individual orders 117, the process ends.

Figure 3A:
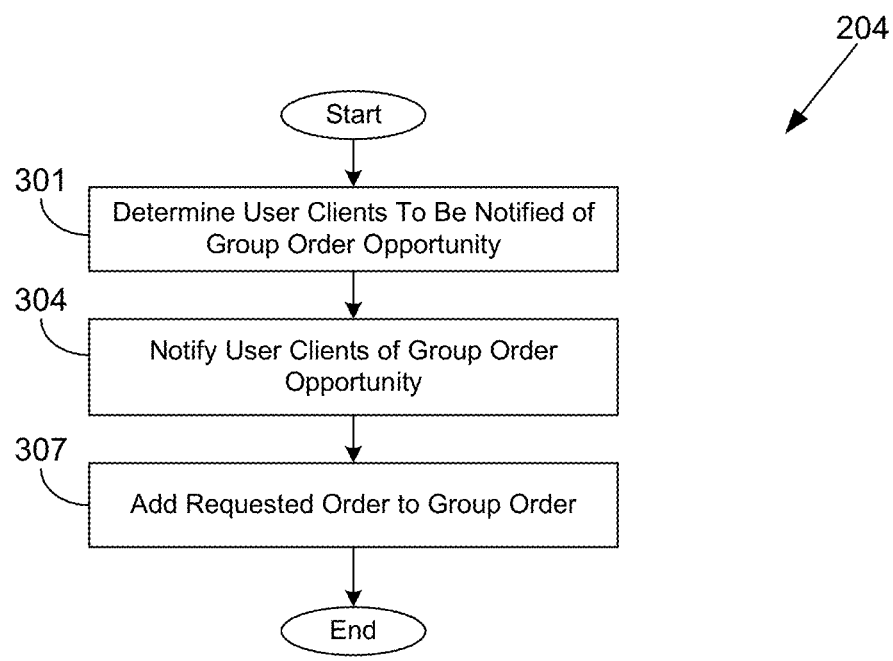

Moving on to FIG. 3A, shown is a flowchart that provides one example of the operation of a portion of the order management service 114 (FIG. 1) according to various embodiments. Particularly, FIG. 3A describes an approach for receiving requests 147 (FIG. 1) to add an order 117 (FIG. 1) to a pending group order 131 (FIG. 1) as described by box 204 of FIG. 2. It is understood that the flowchart of FIG. 3A provides merely an example of the many different types of functional arrangements that may be employed to implement the operation of the portion of the order management service 114 as described herein. As an alternative, the flowchart of FIG. 3A may be viewed as depicting an example of elements of a method implemented in the computing environment 101 (FIG. 1) according to one or more embodiments.

Beginning with box 301, the order management application 114 determines user clients 104 (FIG. 1) to be notified of a group order 131 opportunity. In some embodiments, this includes determining which user clients 104 are located within a predefined distance or boundary defined with respect to a reference point. The reference point may include, for example, a delivery location 127 (FIG. 1) of an order 117 added to the group order 131, or a pickup location 154 (FIG. 1) for a fulfillment provider 124 (FIG. 1) assigned an order 117 (FIG. 1) in the group order 131. The reference point may also include another location.

In other embodiments, the order management application 114 may determine user clients 104 corresponding to user accounts 134 (FIG. 1) associated with another user account 134 having an order 117 in the group order 131. Such an association may include a social networking link, an organizational link, or other association. In further embodiments, the order management application 114 may access user preferences in user accounts 134 to determine whether a corresponding user client 104 should be notified of a group order 131 opportunity. Such user preferences may indicate that a user client 104 should never be notified, should only be notified when one or more defined fulfillment providers 124 are eligible to be ordered from in the group order 131, or should only be notified when one or more defined or determined user accounts 134 are participating in the group order 131. Other approaches may also be used to determine whether a user client 104 should be notified of a group order 131 opportunity.

Next, in box 304, the order management service 114 notifies the determined user clients 104 of the group order 131 opportunity. In some embodiments, this includes communicating a solicitation to add an order 117 to the group order 131. Such an order 117 may include a preexisting order 117 or a subsequently created order 117. The solicitation may be communicated as a push notification, email message, text or SMS message, as data communicated to a client application 141 accessing the order management service 114, or communicated as other message.

In other embodiments, a user client 104 may be notified of a group order 131 opportunity in response to accessing content served by the order management service 114. For example, a user client 104 may access a network page or application data facilitating the creation of an order 117 with the order management service 114, thereby rendering a user interface 151 (FIG. 1) on a display 137 of the user client 104. If the user client 104 was determined to be notified of the group order 131 opportunity, the order management service 114 may modify or add an element of the user interface 151 to facilitate the creation of a new order 117 for addition to the group order 131. For example, the user interface 151 may include a button, menu element, or other user interface 151 element that, when selected, enters the user client 104 into an order 117 creation pipeline whose resulting order 117 is added to the group order 131. Thus, user client 104 determined to be notified of the group order 131 opportunity receive a distinct user interface 151 from other user clients 104 accessing content of the order management service 114. User clients 104 may also be notified of the group order 131 opportunity by another approach. The process then advances to box 307, where the order management service 114 adds, to the group order 131, orders 117 having requests 147 to add them to the group order 131, after which the process ends.

Figure 3B:
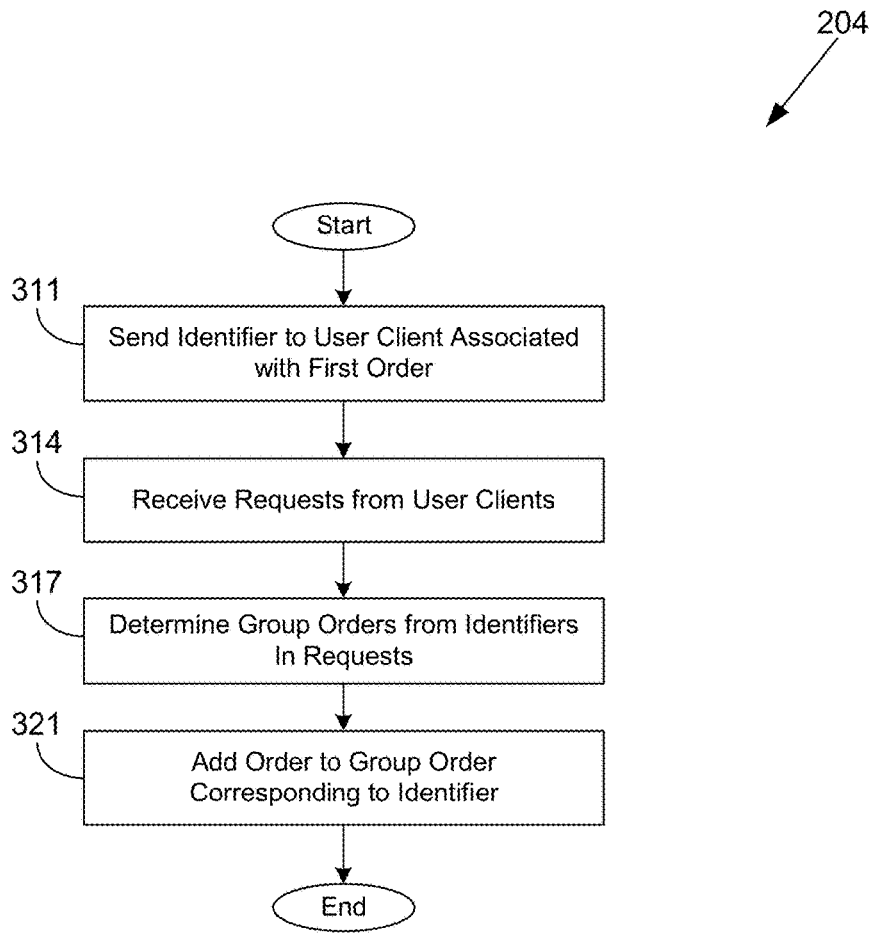

Turning now to FIG. 3B, shown is a flowchart that provides one example of the operation of a portion of the order management service 114 (FIG. 1) according to various embodiments. Particularly, FIG. 3B describes an approach for receiving requests 147 (FIG. 1) to add an order 117 (FIG. 1) to a pending group order 131 (FIG. 1) as described by box 204 of FIG. 2. It is understood that the flowchart of FIG. 3B provides merely an example of the many different types of functional arrangements that may be employed to implement the operation of the portion of the order management service 114 as described herein. As an alternative, the flowchart of FIG. 3B may be viewed as depicting an example of elements of a method implemented in the computing environment 101 (FIG. 1) according to one or more embodiments.

Beginning with box 311, the order management system 114 sends an identifier 144 (FIG. 1) to a user client 104 (FIG. 1) associated with a first order 117 of a pending group order 131 (FIG. 1). In some embodiments, the identifier 144 may be randomly generated identifier 144, an identifier 144 comprising a hash value or string, or other identifier 144 generated by the order management service 114. In other embodiments, the identifier 144 may include a value identified by or obtained from the user client 104. The identifier 144 may also include other values.

Communicating the identifier 144 to the user client 104 may include encoding the identifier 144 in a network page or other content rendered by the user client 104. In other embodiments, the identifier 144 may be communicated in a notification such as a push notification, in an email or Short Message Service (SMS) message, or communicated by another approach.

Next, in box 314, the order management service 114 receives requests 147 (FIG. 1) to add orders 117 to a group order 131. Such requests 147 may indicate an existing order 117 to add to a group order 131, or indicate that a corresponding subsequently created order 117 should be added to the group order 131. In box 317, the order management service 114 determines a corresponding group order 131 from identifiers 144 included in the requests 147. Then, in box 321, the order management service 114 adds the orders 117 corresponding to the requests 147 to the group order 131 corresponding to the identifier 144, after which the process ends.

Figure 4:
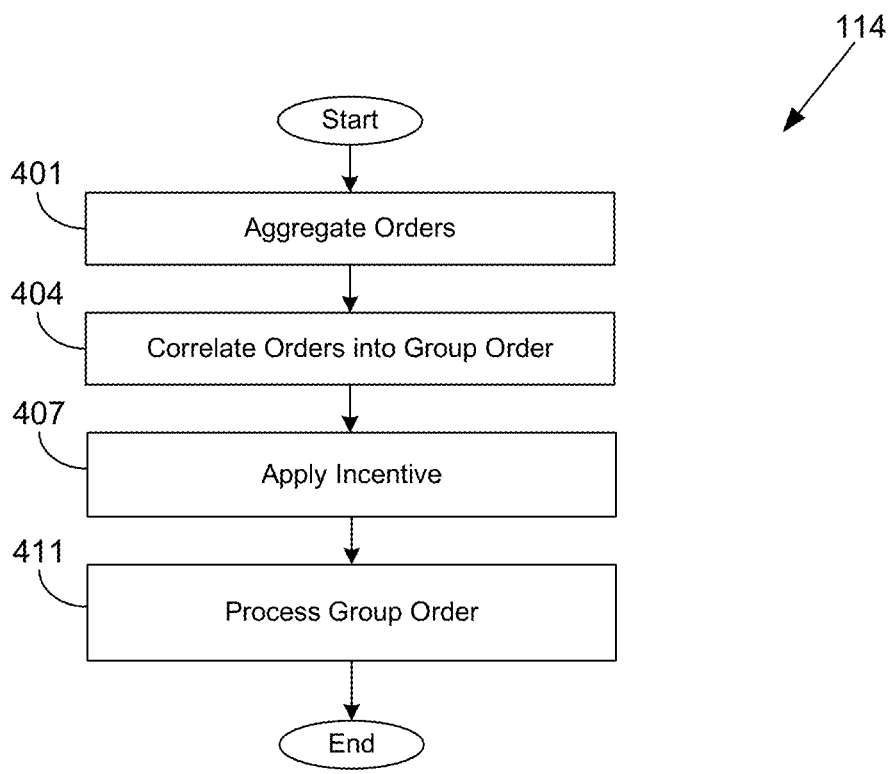

Moving on to FIG. 4, shown is a flowchart that provides one example of the operation of a portion of the order management service 114 (FIG. 1) according to various embodiments. Particularly, FIG. 4 describes an approach for receiving automatically correlating orders 117 (FIG. 1) into a group order 131 (FIG. 1). It is understood that the flowchart of FIG. 4 provides merely an example of the many different types of functional arrangements that may be employed to implement the operation of the portion of the order management service 114 as described herein. As an alternative, the flowchart of FIG. 4 may be viewed as depicting an example of elements of a method implemented in the computing environment 101 (FIG. 1) according to one or more embodiments.

Beginning with box 401, the order management service 114 aggregates orders 117 submitted by user clients 104 (FIG. 1). Next, in box 404, the order management service 114 correlates orders 117 into group orders 131. In some embodiments, this includes clustering or grouping orders 117 across one or more dimensions, including the fulfillment provider 124 (FIG.), pickup location 154 (FIG. 1), delivery location 127 (FIG. 1), order 117 submission time, estimated pickup time, estimated delivery time, or other dimension. The order management service 114 may then correlate orders 117 into a group order 131 according to the clustering. In other embodiments, this may include one or more rules to the dimensions described above, or to other attributes, Orders 117 may also be correlated in order to satisfy one or more terms of a group order 131. Terms to be satisfied for the group order 131 may include, for example, a minimum number of participants, orders 117, items 121 (FIG. 1), or total cost for the group order 131. Other criteria may also be tied to determining a satisfactory group order 131.

The process then advances to box 407 where the order management application 114 applies an incentive 157 (FIG. 1) to one or more user accounts 134 (FIG. 1) associated with the group order 131. This may include, for example, applying a discount to one or more orders 117 in the group order 131, applying a credit to the user account 134 for a future purchase, waiving an order minimum for a fulfillment provider 124 (FIG. 1), waiving a delivery fee, or applying another incentive 157.

After applying the incentive 157 the process advances to box 411 where the order management application 114 processes the orders 117 in the group order 131. This may include processing one or more payment instruments of user accounts 134. This may also include communicating the orders 117 to the respective fulfillment providers 124. In some embodiments, the order management service 114 may determine a timing for when the orders 117 should be communicated to the fulfillment clients 105 (FIG. 1) of the fulfillment providers 124. For example, an order 117 may be communicated to a fulfillment client 105 based on estimated travel time between a courier's current or projected location and a pickup location 154 (FIG. 1) of the corresponding fulfillment provider 124. This may take into account an average, estimated, or otherwise determined preparation time for a given order 117. For example, the order management service 114 may calculate an estimated or average preparation time based on previously recorded preparation times. The order management system 114 may then communicate the order 117 to the fulfillment provider 124 to minimize a time between an arrival by a courier at the pickup location and completing the preparation of the order 117. In other embodiments, the order management service 114 may communicate the orders 117 to the fulfillment provider 124 with an estimated pickup time based on projected travel times for the courier to pick up or deliver orders 117 in the group order 131. The order management service 114 can also determine the timing by another approach. After processing the group order 131, the process ends.

Figure 5A:
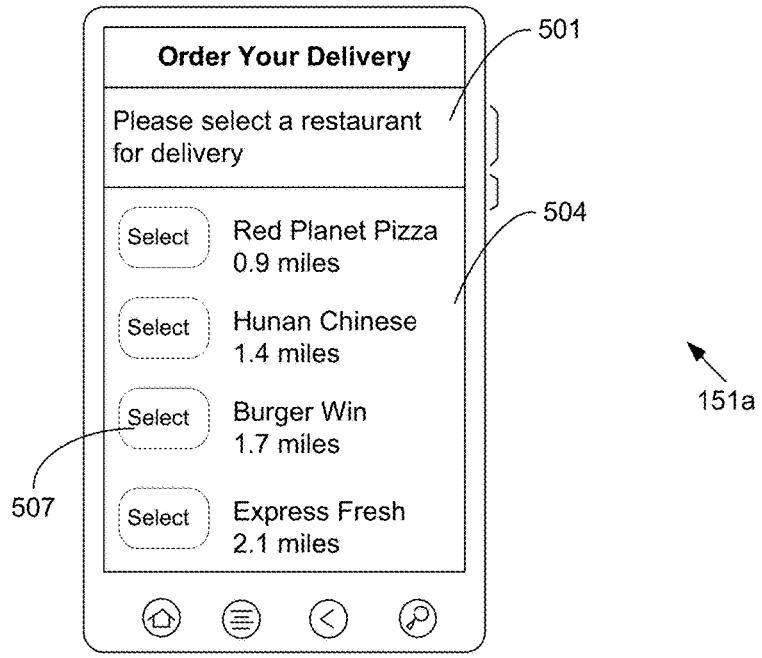
FIGS. 5A, 5B and 6 are pictorial diagrams of example user interfaces rendered by a client in the networked environment of FIG. 1 according to various embodiments of the present disclosure.

Referring next to FIG. 5A, shown is an example user interface 151a facilitating the creation of an order 117 (FIG. 1) via the order management service 114 (FIG. 1). In this example, the user interface 151a is rendered on a user client 104 (FIG. 1) ineligible for participation in pending group order 131 (FIG. 1). For example, the user client 104 may not be geographically proximate to delivery locations 127 (FIG. 1) or pickup locations 154 (FIG. 1) for pending orders 117. As another example, user preferences of a user account 134 (FIG. 1) corresponding to the user client 104 (FIG. 1) may be restricting the user client 104 from receiving notifications regarding opportunities to join pending group orders 131. Thus, the user interface 151a lacks elements facilitating the addition of an order 117 created using the user client 104 to a pending group order 131. However, creation of an order 117 through this example user interface 151a may create an opportunity for a group order 131 to be joined by orders 117 subsequently created by other user clients 104.

Element 501 is a solicitation to select a restaurant fulfillment provider 124 (FIG. 1) with which an order 117 will be placed. Element 504 is a listing of eligible fulfillment providers 124. Element 507 is a button that, when selected, initiates an order 117 creation pipeline with the selected fulfillment provider 124.

Figure 5B:
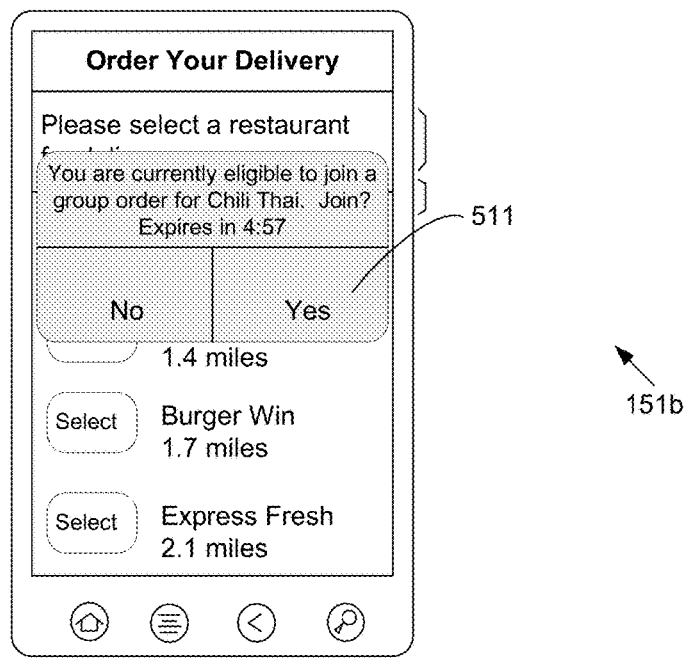

Turning now to FIG. 5B, shown is an example user interface 151b facilitating the creation of an order 117 (FIG. 1) via the order management service 114 (FIG. 1). In this example, the user interface 151b is rendered on a user client 104 (FIG. 1) eligible for participation in pending group order 131 (FIG. 1). For example, the user client 104 may be geographically proximate to delivery locations 127 (FIG. 1) or pickup locations 154 (FIG. 1) for pending orders 117. Thus, the user interface 151b includes a user interface element 511 that, when interacted with, indicates that an order 117 created through the user interface 151b should be added to the indicated pending group order 131.

Figure 6:
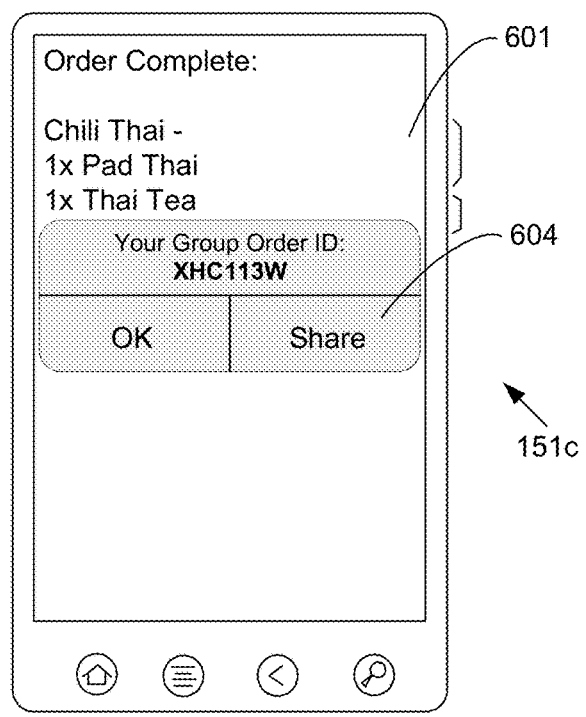

Moving on to FIG. 6, shown is an example user interface 151c rendered on a user client 104 (FIG. 1) depicting an identifier 144 (FIG. 1) facilitating the addition of orders 117 (FIG. 1) to a group order 131 (FIG. 1) including an order 117 created by the user client 104. In this example, the user interface 151c includes an order 117 confirmation screen corresponding to element 601. Also included in the user interface 151c is an element 604 indicating the identifier 144. Although the user interface 151c shows element 604 as a notification overlay on top of element 601, element 604 can also be encoded a button, screen, menu element, or other user interface 151 element as can be appreciated. Included in element 604 is a button that, when interacted with, initiates a sharing of the identifier 144. The identifier 144 may be shared through a social messaging platform, social media platform, email service, text or SMS service, or by another approach.

Figure 7:
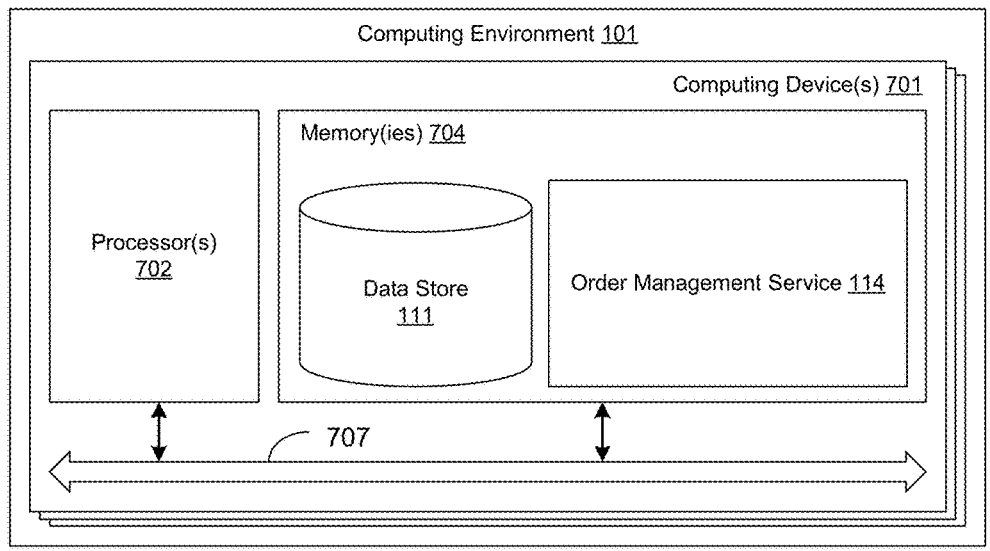
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 101 according to an embodiment of the present disclosure. The computing environment 101 includes one or more computing devices 701. Each computing device 701 includes at least one processor circuit, for example, having a processor 702 and a memory 704, both of which are coupled to a local interface 707. To this end, each computing device 701 may comprise, for example, at least one server computer or like device. The local interface 707 may comprise, for example, a data bus with an accompanying address/control bus or other bus structure as can be appreciated.

Stored in the memory 704 are both data and several components that are executable by the processor 702. In particular, stored in the memory 704 and executable by the processor 702 are an order management service 114, and potentially other applications. Also stored in the memory 704 may be a data store 111 and other data. In addition, an operating system may be stored in the memory 704 and executable by the processor 702.

It is understood that there may be other applications that are stored in the memory 704 and are executable by the processor 702 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 704 and are executable by the processor 702. In this respect, the term "executable" means a program file that is in a form that can ultimately be run by the processor 702. Examples of executable programs may be, for example, a compiled program that can be translated into machine code in a format that can be loaded into a random access portion of the memory 704 and run by the processor 702, source code that may be expressed in proper format such as object code that is capable of being loaded into a random access portion of the memory 704 and executed by the processor 702, or source code that may be interpreted by another executable program to generate instructions in a random access portion of the memory 704 to be executed by the processor 702, etc. An executable program may be stored in any portion or component of the memory 704 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 704 is defined herein as including both volatile and nonvolatile memory and data storage components. Volatile components are those that do not retain data values upon loss of power. Nonvolatile components are those that retain data upon a loss of power. Thus, the memory 704 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 702 may represent multiple processors 702 and/or multiple processor cores and the memory 704 may represent multiple memories 704 that operate in parallel processing circuits, respectively. In such a case, the local interface 707 may be an appropriate network that facilitates communication between any two of the multiple processors 702, between any processor 702 and any of the memories 704, or between any two of the memories 704, etc. The local interface 707 may comprise additional systems designed to coordinate this communication, including, for example, performing load balancing. The processor 702 may be of electrical or of some other available construction.

Although the order management service 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 show the functionality and operation of an implementation of portions of the order management service. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 702 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the order management service, that comprises software or code can be embodied in any non-transitory computer-readable medium for use by or in connection with an instruction execution system such as, for example, a processor 702 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the order management service, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 701, or in multiple computing devices in the same computing environment 101. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device configured to at least:
determine at least one geographically proximate client falling within a geographic boundary relative to a first client;
communicate a solicitation to the at least one geographically proximate client to submit, for addition to a group order including a first order, at least one second order, the first order and the at least one second order corresponding to a same delivery route in the group order;
generate, in response to a request to add the at least one second order to the group order, the group order;
determine that an addition of the at least one second order to the group order does not exceed a group order capacity threshold for at least one fulfillment provider, the group order capacity threshold comprising a restriction on a quantity of pending orders for the at least one fulfillment provider;
apply to at least one user account corresponding to the first client or the at least one geographically proximate client, an incentive for participating in the group order;
determine at least one time to communicate the first order or the at least one second order to a corresponding the at least one fulfillment provider, wherein the at least one time is based at least in part on an estimated travel time between a current location of a courier and a pickup location of the corresponding at least one fulfillment provider;
communicate the first order and the at least one second order to the corresponding at least one fulfillment provider at the at least one time; and
wherein the first order and the at least one second order are associated with a preparation time by the corresponding at least one fulfillment provider.

2. The system of claim 1, wherein the at least one computing device is further configured to at least determine the geographic boundary relative to a delivery location of the first order.

3. The system of claim 1, wherein the solicitation comprises at least one of a text message, an email message, or a push notification.

4. The system of claim 1, wherein communicating the solicitation comprises modifying a user interface encoded for rendering by the at least one geographically proximate client to include a user interface element facilitating a creation of the at least one second order.

5. The system of claim 4, wherein an interaction with the user interface element generates the at least one second order as comprising contents of the first order.

6. The system of claim 1, wherein the incentive comprises at least one of a discount, a waiver of an order minimum, a waiver of a delivery fee, or a promotional discount on a future order.

7. The system of claim 1, wherein the at least one computing device is further configured to restrict the at least one second order to at least one geographically proximate fulfillment provider relative to a fulfillment provider of the first order.

8. The system of claim 1, wherein the at least one computing device is further configured to at least take an alternative action responsive to the group order failing to satisfy at least one of a minimum number of participants or a minimum order amount.

9. The system of claim 8, wherein the alternative action comprises at least one of: withholding an application of the incentive, a division of the group order into a plurality of separate orders comprising the first order and the at least one second order or communicating a notification to the first order or the at least one second order indicating an ineligibility for the group order.

10. A non-transitory computer-readable medium embodying a program executable in at least one computing device, wherein, when executed, the program causes the at least one computing device to least:
enable a group order associated with a first order in response to receiving the first order from a first client;
determine at least one geographically proximate client falling within a geographic boundary relative to the first client;

receive a request for at least one second order to join the group order, wherein the at least one second order being associated with the at least one geographically proximate client, and the group order comprises the first order;

determine that an addition of the at least one second order to the group order exceeds a group order capacity threshold for a quantity of pending orders for at least one fulfillment provider;

process the first order and the at least one second order individually in response to the determination that the addition of the at least one second order to the group order exceeds the group order capacity threshold for the at least one fulfillment provider, wherein the first order and the at least one second order are removed from the group order;

communicate the first order and the at least one second order to the at least one fulfillment provider; and wherein the first order and the at least one second order are associated with a preparation time by the at least one fulfillment provider.

11. The non-transitory computer-readable medium of claim 10, wherein the at least one computing device is further configured to at least determine the geographic boundary relative to a delivery location of the first order.

12. The non-transitory computer-readable medium of claim 10, wherein receiving the request for the at least one second order to join the group order occurs in response to communicating a solicitation to the at least one geographically proximate client to submit the at least one second order, communicating the solicitation comprises modifying a user interface encoded for rendering by the at least one geographically proximate client to include a user interface element facilitating a creation of the at least one second order.

13. A method, comprising:

determining, via at least one computing device, at least one geographically proximate client falling within a geographic boundary relative to a first client;

communicating, via the at least one computing device, a solicitation to the at least one geographically proximate client to submit, for addition to a group order including a first order, at least one second order, the first order and the at least one second order corresponding to a same delivery route in the group order;

generating, via the at least one computing device, in response to a request to add the at least one second order to the group order, the group order;

determining, via the at least one computing device, that an addition of the at least one second order to the group order does not exceed a capacity threshold for at least one fulfillment provider, the capacity threshold comprising a restriction on a quantity of pending orders for the at least one fulfillment provider;

applying, via the at least one computing device, to at least one user account corresponding to the first client or the at least one geographically proximate client, an incentive for participating in the group order;

determining, via the at least one computing device, at least one time to communicate the first order or the at least one second order to a corresponding at least one fulfillment provider, wherein the at least one time is based at least in part on an estimated travel time between a current location of a courier and a pickup location of the corresponding at least one fulfillment provider;

communicating, via the at least one computing device, the first order and the at least one second order to the corresponding at least one fulfillment provider at the at least one time; and wherein the first order and the at least one second order are associated with a preparation time by the corresponding at least one fulfillment provider.

14. The method of claim 13, further comprising determining, via the at least one computing device, the geographic boundary relative to a delivery location of the first order.

15. The method of claim 13, wherein the solicitation comprises at least one of a text message, an email message, or a push notification.

16. The method of claim 13, wherein communicating the solicitation comprises modifying a user interface encoded for rendering by the at least one geographically proximate client to include a user interface element facilitating a creation of the at least one second order.

17. The method of claim 13, wherein the incentive comprises at least one of a discount, a waiver of an order minimum, a waiver of a delivery fee, or a promotional discount on a future order.

18. The method of claim 13, further comprising receiving, via the at least one computing device, a request to add a third order to the group order, wherein the request transmitted by a second client device and the request includes an identifier associated with the group order, the identifier comprising a hash value.

19. The method of claim 18, further comprising adding, via the at least one computing device, the third order to the group order based at least in part on the identifier of the request corresponding to a group order identifier.

20. The method of claim 13, further comprising determining, via the at least one computing device, that the group order satisfies a group order condition after a predefined time from a submission of the first order, wherein the group order condition comprises a minimum quantity of participants or a minimum quantity of orders.

* * * * *